(12) United States Patent
Ramphal (10) Patent No.: US 8,129,102 B2
(45) Date of Patent: Mar. 6, 2012

(54) METHOD FOR HARVESTING AND PREPARING PORCINE HEARTS FOR USE IN A CARDIAC SURGICAL SIMULATOR

(75) Inventor: Paul S. Ramphal, Nassau (JM)

(73) Assignee: The University of the West Indies, Kingston (JM)

( * ) Notice: Subject to any disclaimer, the term of this patent is extended or adjusted under 35 U.S.C. 154(b) by 443 days.

(21) Appl. No.: 12/485,512

(22) Filed: Jun. 16, 2009

(65) Prior Publication Data

US 2009/0311662 A1    Dec. 17, 2009

Related U.S. Application Data

(60) Provisional application No. 61/061,929, filed on Jun. 16, 2008.

(51) Int. Cl.
*G09B 23/28* (2006.01)
*A01N 1/00* (2006.01)

(52) U.S. Cl. ........................................ 435/1.1; 434/272
(58) Field of Classification Search .................. 434/272
See application file for complete search history.

(56) References Cited

U.S. PATENT DOCUMENTS

| 5,374,194 A | 12/1994 | Walcerz et al. |
| 5,947,744 A | 9/1999 | Izzat |
| 6,234,804 B1 | 5/2001 | Yong |
| 2004/0033477 A1 | 2/2004 | Ramphal et al. |

OTHER PUBLICATIONS

International Search Report and Written Opinion for International Application No. PCT/IB2009/006242 mailed Dec. 2, 2009. 14 pages.

*Primary Examiner* — Sandra Saucier
(74) *Attorney, Agent, or Firm* — Wilmer, Cutler, Pickering, Hale and Dorr LLP (57) ABSTRACT

A method is described and disclosed for harvesting and preparing porcine hearts that may be used, among other things, as an improved analog of the human heart in cardiac simulator systems for training surgical personnel for performing beating heart surgery.

26 Claims, 6 Drawing Sheets

METHOD FOR HARVESTING AND PREPARING PORCINE HEARTS FOR USE IN A CARDIAC SURGICAL SIMULATOR

CROSS REFERENCE TO RELATED APPLICATIONS

This application claims the priority under 35 U.S.C. §119 (e) of U.S. Provisional Application No. 61/061,929, filed Jun. 16, 2008, which is incorporated herein by reference.

TECHNICAL FIELD

The present invention relates to methods for preparing analogs for human organs for training medical professionals. More specifically, the present invention relates to methods for harvesting and preparing analogs for human organs for training medical professionals in surgical techniques.

BACKGROUND OF THE INVENTION

In order to provide better medical care to the human population, it is necessary for medical professionals to be highly trained. This training begins in the professional schools and institutions devoted to teaching and training medical professionals, such as universities, medical schools, nursing schools, and military training facilities to name a few.

One of the areas that require a great deal of training for physicians, nurses, and technicians is training for performing operating room surgical procedures. Operating team members continually train in current and newer techniques/procedures to be up-to-date on available medical techniques for operating on patients.

One specific area that requires a great deal training for physicians, nurses, and technicians is performing surgery procedures/techniques for operating on the human heart. For example, there are a number of pathologic conditions affecting the human heart, such as, coronary artery stenosis and cardiac valve disease, including stenosis or regurgitation, each of which requires a different operating procedure. In order to perform the surgical techniques/procedures for treating these pathologic conditions, medical professionals will train on cadavers and observe actual procedures being carried out by others.

Many of the surgical techniques/procedures performed on the heart use the conventional method of stopping the heart while the procedure is being performed. During this time, the patient is maintained on a heart lung machine to permit the medical professionals to operate on a generally stationary heart. These procedures have the disadvantage of requiring heart stoppage.

Recent developments in heart surgery procedures have recognized the efficacy and benefits of operating on the heart while it is still beating. However, performing beating heart surgery requires a great deal of surgical skill and training. This training is lengthy, intensive, and requires a great deal of practice. This training/practice in-part may be facilitated by the use of surgical models and simulators allowing the surgeon to practice the needed techniques for carrying out beating heart surgery.

In order to provide medical professionals with the best training/practice for carrying out beating heart surgery, it is necessary to have the very best analogs of a beating human heart on which to practice. Therefore, it is not only necessary to provide surgical teams with a cardiac simulator with a heart on which to practice, but it would be more highly preferred to provide a cardiac simulator that as close as possible will mimic the size, structure, and beating characteristics of a human heart. Moreover, it is also preferable to provide a cardiac simulator with a heart that as close as possible can be configured to as accurately as possible simulate the abnormalities that would be experienced by medical professionals in conducting beating heart surgery.

The present invention provides a method for harvesting and preparing porcine hearts for use in cardiac simulators to provide an improved analog of the human heart for training for conducting beating heart surgery.

SUMMARY OF THE INVENTION

The present invention is a method for harvesting and preparing porcine hearts that may be used, among other things, as an improved analog of the human heart in cardiac simulators for training surgical personnel for performing beating heart surgery. Preferably, the porcine hearts harvested and prepared according to the present invention may be used in the computerized simulator system disclosed and claimed in co-pending U.S. patent application Ser. No. 10/405,809, titled "A Computer-Controlled Tissue Based Simulator for Training in Cardiac Surgical Techniques." The entire contents of this co-pending application are incorporated herein by reference.

The method of the present invention will permit porcine hearts to be harvested from host porcine animals and prepared such that when appropriately and correctly connected to a cardiac simulator they may be operated to provide an improved analog for a human beating heart for purposes of surgical training. According to the method of the present invention, a block of tissue that includes the right and left porcine lungs attached to the porcine heart is provided. Preferably, the heart is still in a substantially intact pericardium. The tissue block will also include a length of aorta and the porcine trachea. The tissue block should include a length of the superior and inferior vena cavas. The tissue block should be properly cleaned before dissection.

In carrying out dissection, the inferior vena cava ("IVC") and superior vena cava ("SVC") are identified and transected leaving as much possible to their lengths. In dissecting the IVC and SVC, they are cleared of adjacent areolar and lymphatic tissue as much as possible. Further, the IVC is cleared of any diaphragmic muscle.

After identification, dissection, and transection of the IVC and SVC, the superior and inferior pulmonary veins ("PV") become visible. First, lymphatic tissue is cleared from the right PVs ("RPVs"). In dissecting the RPVs, the maximum length of these veins should be preserved, therefore, the RPVs are transected as far distally as possible. This transection is preferably proximal to the disappearance of the RPVs into the lungs.

Now with the right pulmonary artery ("RPA") visible superior to the RPVs and medial to the SVC, the lymphatic tissue surrounding the RPA is removed. The RPA is cleared and in doing so it is traced as far laterally as possible and transected immediately prior to its entry into the lungs.

Dissection continues medially across the midline to the left pulmonary veins ("LPVs") (superior and inferior) and the left pulmonary artery ("LPA"). The LPVs and LPA are dissected and transected as far distally as possible in substantially the same manner as the RPVs and RPA.

Next, the aorta is dissected. This dissection begins distally and continues proximally until the trachea is also separated from the aorta. The aorta is dissected, all the way to the aortic root.

The aorta having now been separated is transected immediately proximal to the first segmental intercoastal branches, which will leave a length of the ascending and transverse aortic arch attached to the heart. There are only two great arteries branching from the anterior surface of the aorta. These are the innominate and carotid arteries. These are transected leaving a preferred length extending from the aortic surface. A lesser artery also extending from the aorta is transected and ligated.

At this point in the harvesting process, all remaining fibrous and areolar connections to the heart and great vessels are transected. This will leave the heart and great vessels free of the lungs, trachea, and esophagus. The lungs, trachea, and esophagus may now be discarded.

The open ends of the PV (LPV, RPV) orifices, and SVC and IVC orifices are purse string sutured. This is followed by the distal ends of the LPA and RPA being ligated.

Following the suturing of the LPV and RPV orifices and ligation of the LPA and RPA, an inflatable balloon is passed into the right ventricle ("RV") cavity through the SVC, right atrium (RA), and tricuspid valve ("TV"). The neck of this first balloon is secured to the SVC orifice by tightening of the purse string suturing around a flange connector fitted to the balloon neck. A second balloon is inserted in the left ventricle ("LV") through the LPV, left atrium ("LA"), and mitral valve ("MV"). The neck of the second balloon is secured to one of the PV orifices by tightening the purse string suturing around a flange connector fitted to the balloon neck.

Using the sutures of the purse string suturing on the remaining LPVs and RPVs, a flange connector is secured in each orifice. Each connector has a length of tubing extending from it that has a plug disposed in the distal end.

The distal large branch of the ascending aorta, the common carotid artery, is ligated close to the aorta anterior. The proximal branch, the innominate artery, of the ascending aorta is used to allow the insertion of a length of tubing with a "bump" on the inserted end. The tubing is secured within the innominate artery with ligature and forms the aortic root perfusion catheter. The distal end of the tube will have a fitting secured to it.

Next, using the sutures of the IVC purse string suturing, a flange connector and length of tubing is attached to IVC. Upon the completion of this step, the porcine heart is harvested and prepared for use in a cardiac simulator system.

The present invention will be described in greater detail in a remainder of the specification and claims referring to drawings.

DETAILED DESCRIPTION OF DRAWINGS

The present invention is a method for harvesting and preparing porcine hearts for use, among other things, as improved analogs of human hearts for use in cardiac simulators for training surgical personnel in performing beating heart surgery. Before the method of harvesting and preparing porcine hearts is described in detail, a general discussion of a porcine heart, and a comparison of the human and porcine heart will be provided.

Figure 1:
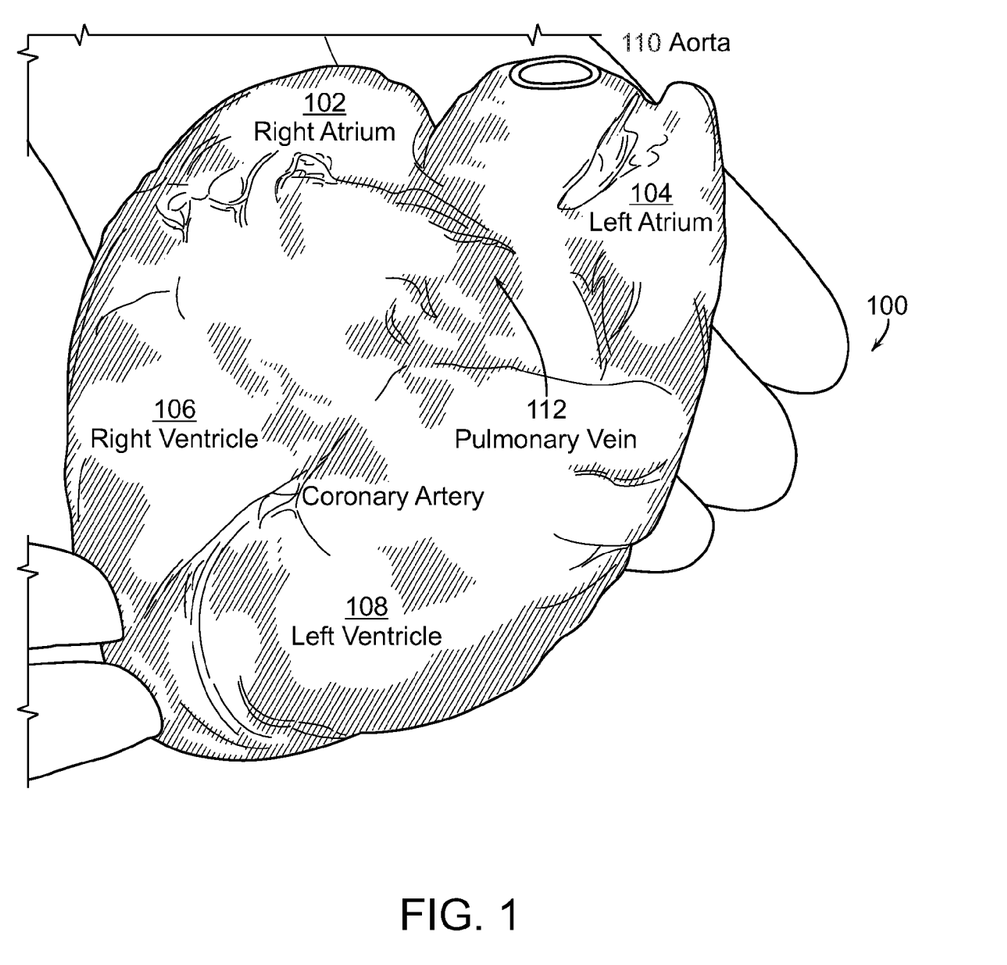
FIG. 1 is an annotated photograph of a perspective view of a porcine heart.
Figure 2A:
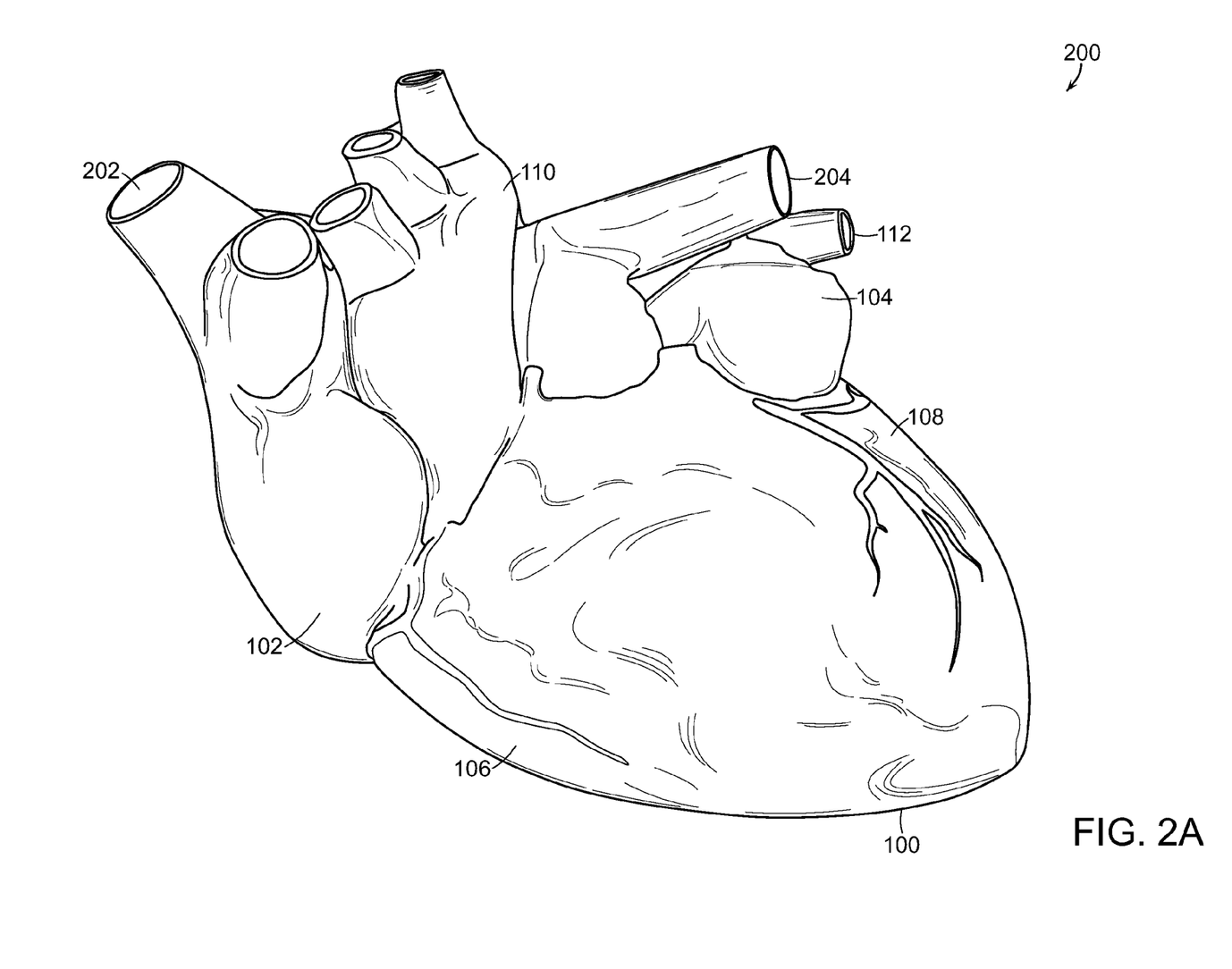
FIGS. 2A and 2B show two perspective views of an anterior representation of a porcine heart.
Figure 2B:
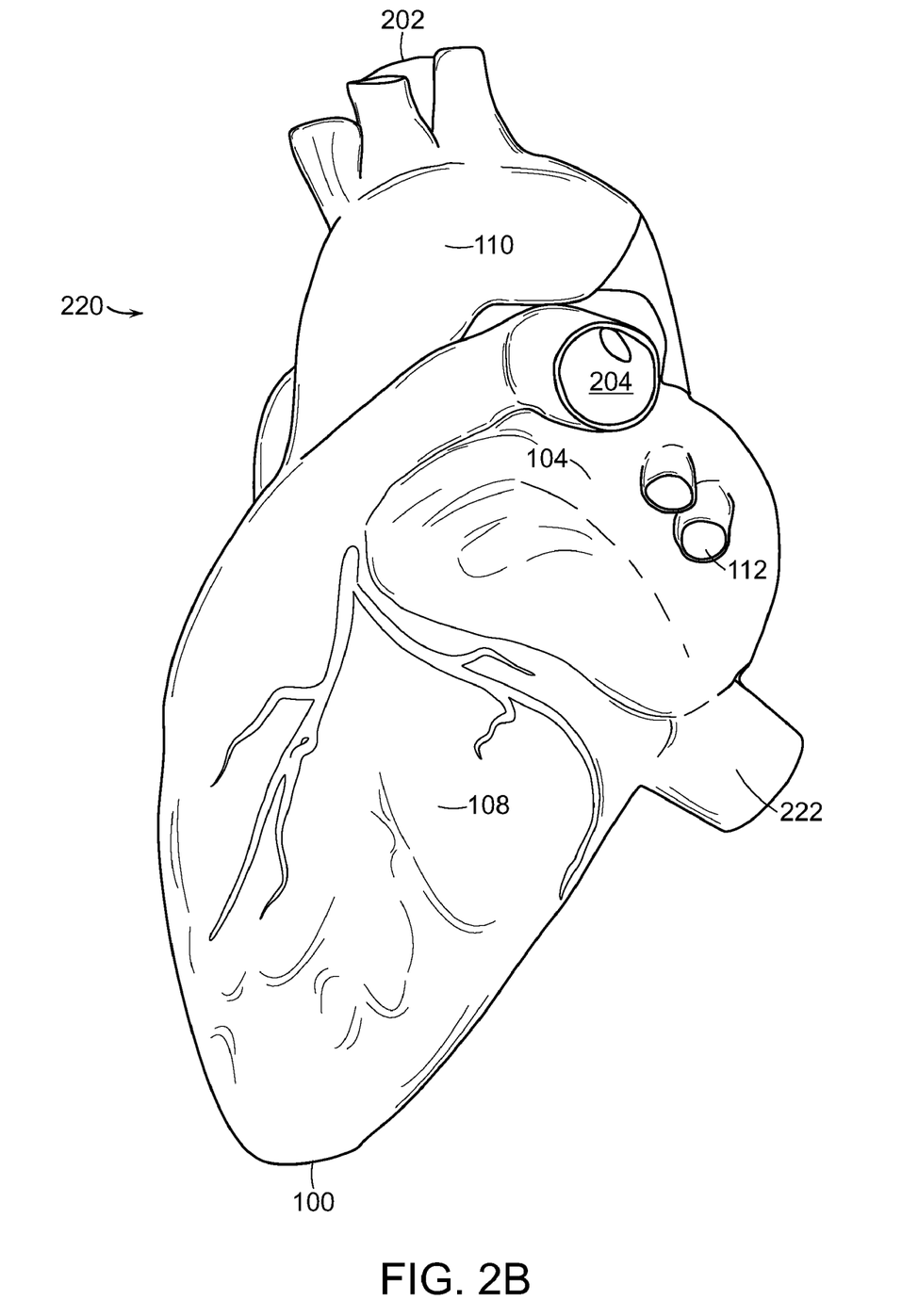

Referring to FIG. 1, generally at 100, an annotated photograph of a porcine heart is shown. Referring to FIGS. 2A and 2B, generally at 200 and 220, respectively, left and right side perspective views of an anterior representative porcine heart are shown. FIGS. 1, 2A, and 2B will now be referred to in describing a porcine heart.

The porcine heart, like a human heart, has four chambers. These are right atrium 102, left atrium 104, right ventricle 106, and left ventricle 108. Further, the porcine heart has aorta 110 and pulmonary vein 112. Each of the four chambers is joined to large blood vessel. A valve is disposed between each upper and lower chamber of the heart. As such, there is a valve between the left atrium and left ventricle, and one between the right atrium and right ventricle. There is also a valve disposed between each lower chamber and the blood vessel exiting it.

Right atrium 102 is one of the receiving chambers of the heart. It is thin-walled and small compared to right ventricle 106. Right ventricle 106 is located under right atrium 102 and is large, thick-walled, and covered with fat deposits. Blood flows into the right atrium from superior vena cava ("SVC") 202 and inferior vena cava ("IVC") 222. The SVC and IVC carry blood from the body back to the right atrium 102 of porcine heart 100.

Figure 4:
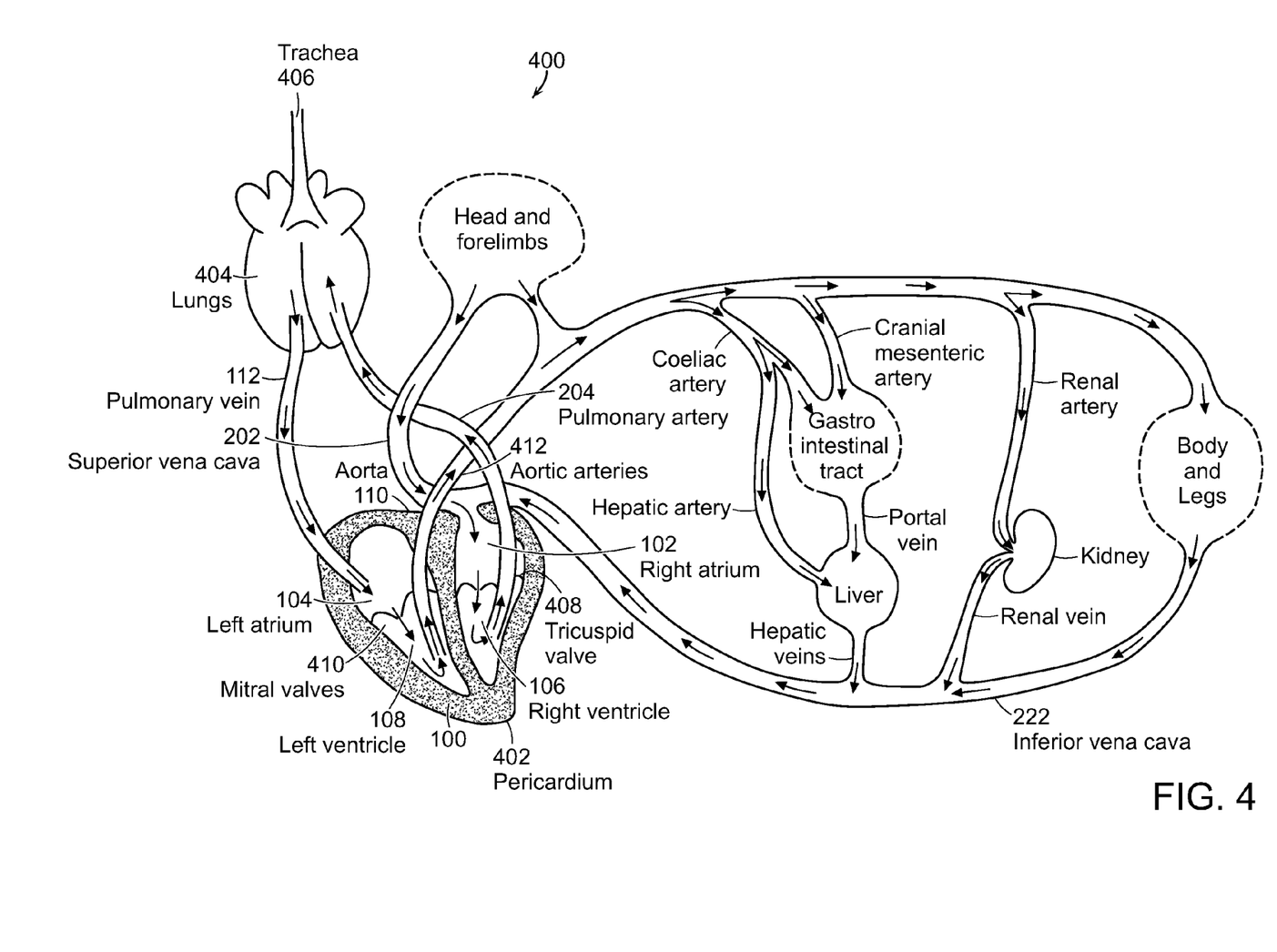
FIG. 4 shows a representative illustration of a porcine circulatory system.

Blood flows from right atrium 102 into right ventricle 106 through a tricuspid valve ("TV") 408 (FIG. 4). Blood fills right ventricle 106, then the right ventricle contracts and TV 408 closes preventing any backflow into right atrium 102. With the backflow prevented, blood is forced to move upward through a pulmonary semilunar valve (not shown) and into the pulmonary artery 204. Pulmonary artery 204 carries blood deficient of oxygen and rich in carbon dioxide to lungs 406 (FIG. 4). Once the lungs provide the blood with a new supply of oxygen, the blood will flow from the lungs to pulmonary vein 112 to return to left atrium 104. Left atrium 104 is thin-walled and small compared to left ventricle 108.

After left atrium 104 fills with blood, it contracts forcing blood through a mitral valve ("MV") 410 (FIG. 4) into left ventricle 108. The MV 410 will prevent a backflow of blood from the left ventricle to the right atrium. Next, left ventricle 108 contracts and oxygenated blood is forced under very high pressure out through an aortic semilunar valve into aorta 110. The aorta will then distribute blood to the arteries.

Figure 3:
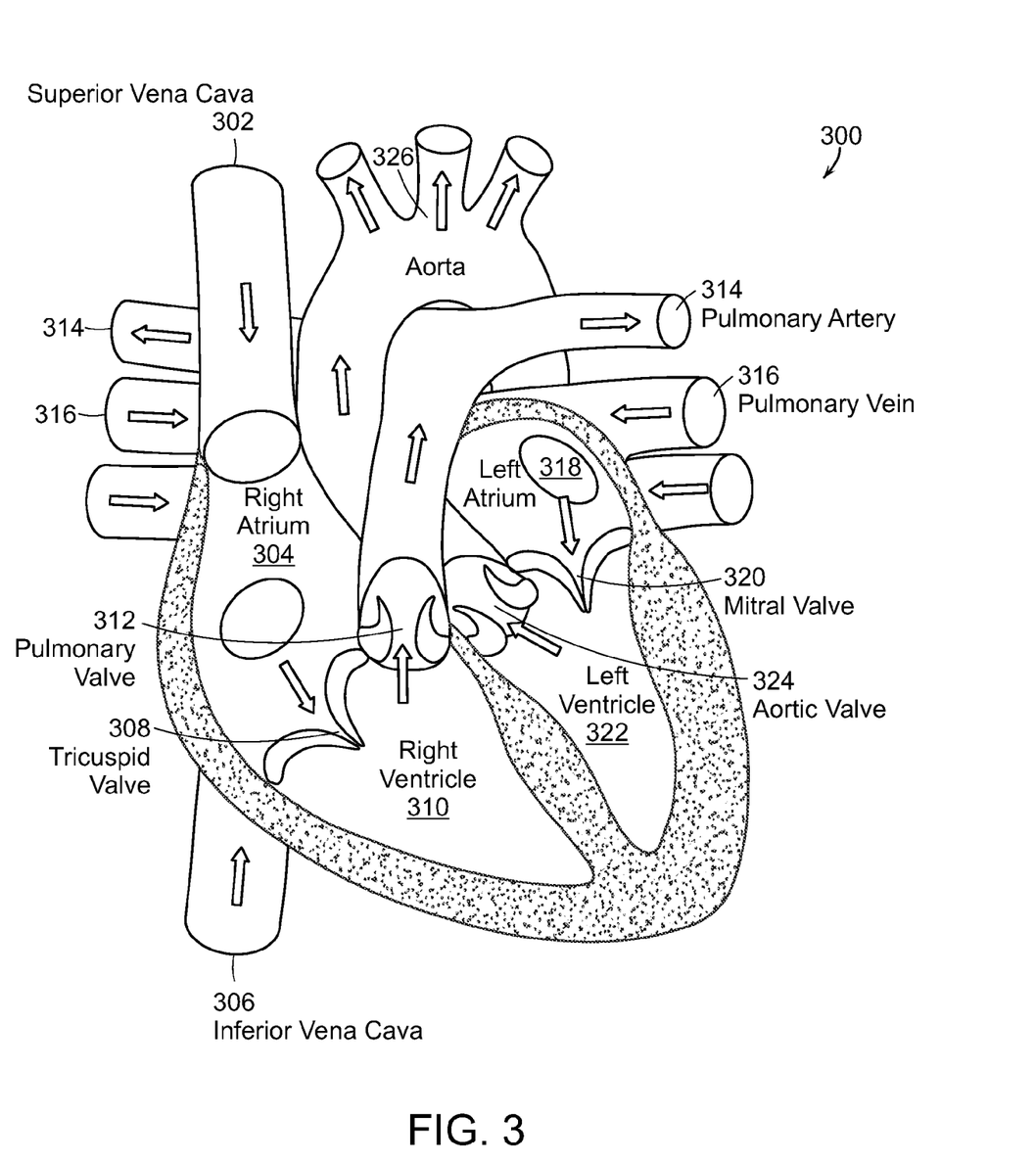
FIG. 3 shows a representative illustration of a sectional view of a human heart.

Referring to FIG. 3, generally at 300, a representative sectional view of a human heart is shown. Blood returning from the body is provided to right atrium 304 through SVC 304 and IVC 306. When right atrium 304 contracts, it forces blood through tricuspid valve 308 into right ventricle 310. Then, when right ventricle 310 contracts, tricuspid valve 308 is closed and the blood is forced upward through pulmonary valve 312 into pulmonary artery 314. Pulmonary artery 314 supplies the blood to the lungs for oxygenation.

The oxygenated blood is supplied through pulmonary vein 316 to left ventricle 318. When left atrium 318 contracts, it forces blood through mitral valve 320 into left ventricle 322. Thereafter, left ventricle 322 will contract closing mitral valve 320 and forcing blood through aortic valve 324 into aorta 326. Aorta 326 will distribute the oxygenated blood to the arteries of the body.

Given the foregoing description of the porcine heart referring to FIGS. 1, 2A, and 2B, and the human heart referring in FIG. 3, it is readily seen that the porcine heart provides an improved analog of the human heart. Therefore, if the porcine heart can be configured to beat in a manner substantially similar to the human heart in a cardiac simulator, it would provide an improved beating heart for training medical professionals for operating on human hearts. Now, the method of the present invention will be described for harvesting and preparing a porcine heart for use, among other things, in the cardiac simulators systems for training medical personnel for beating heart surgery.

As stated, the method of the present invention will permit the porcine heart to be harvested from a host porcine animal and prepared such that when appropriately and correctly connected to a cardiac simulator system, it will function to provide an improved analog for a human beating heart for purposes of surgical training. FIG. 4 will be used to provide an understanding of what will be preferably harvested from the host porcine animal.

Referring to FIG. 4, generally at 400, a porcine circulatory system is shown. Like tissue elements shown in FIG. 4 will have reference numbers the same as in FIGS. 1, 2A, and 2B. As such, porcine heart 100, right atrium 102, left atrium 104, right ventricle 106, left ventricle 108, aorta 110, pulmonary vein(s) 112, SVC 202, pulmonary artery 204, and IVC 222 are marked with the same reference numbers in the four figures. FIG. 4 also shows pericardium 402, lungs 404, and trachea 406, which will also be used in describing the harvesting and preparation of porcine hearts according to the present invention.

According to the method of the present invention, preferably, the tissue block harvested from a porcine will include the right and left porcine lungs 404 including a length of trachea 406, porcine heart 100 in pericardium 402, and the circulatory connections between heart and lungs, namely, pulmonary vein 112 and pulmonary artery 204. The tissue block will also include lengths of aorta 110, SVC 202, and IVC 222.

Preferably, the length of aorta 110 will include the portion up to and including the descending thoracic aorta. This can be assured by identifying the presence of the sequential intercoastal branches that are attached anteriorly to the porcine esophagus. Further, a segment of the diaphragm (not shown) may be included with the IVC. This would assure that at least a 2 cm length of the IVC would be within the tissue block. Upon receipt of the above indicated tissue block, it should cleaned in preparation for dissection.

In carrying out dissection, SVC 202 and IVC 222 are identified and cleared of adjacent areolar and lymphatic tissue as well as any diaphragm muscle that may be attached to the IVC. Preferably, to conserve as much length of the SVC and IVC as possible, each should extend at least a minimum of 1.5 cm from the right atrium ("RA") muscle before transection, it being recognized that if either the SVC and IVC is too long, it may be trimmed later.

Following the dissection of SVC 202 and IVC 222, right superior and inferior pulmonary veins ("RPVs") 112 are identified. Lymphatic tissue associated with the pulmonary veins is removed. Care is given to removal of this lymphatic tissue because the walls of the pulmonary veins are thin and inadvertent perforation must be avoided. RPVs 112 are transected to obtain the maximum length possible. Preferably, they are transected proximal to the point where they disappear into lungs 404.

Right pulmonary artery ("RPA") 204 will be visible superior to the RPVs that have just been transected. RPA 204 will also be identified by being medial to SVC 202. The lymphatic tissue surrounding RPA 202 must be removed. The RPA is now cleared and in doing so is traced as far laterally as possible and transected immediately prior to its entry into lungs 404.

The dissection continues medially across the midline to the left pulmonary veins ("LPVs") and the left pulmonary artery ("LPA"). The LPVs and LPA are dissected and transected as far distally as possible in substantially the same manner as the RPVs and RPA.

It will be understood by one skilled in art that the representations shown in FIG. 4 that relate to pulmonary vein 112 and pulmonary artery 204 are representative of the left and right branches of these veins and arteries and what is shown in FIG. 4 of these being combined is for simplicity of understanding only.

Next, aorta 110 is dissected and transected. Preferably, this is carried out by first grasping the esophagus (not shown) and exerting tension between the esophagus and the descending aorta. This will make it possible to identify the plane of the areolar tissue between the esophagus and the descending aorta. This tissue can be incised to effect the separation and isolation of the aorta. This dissection begins distally and continues proximally until trachea 406 is also separated from aorta 110 in a similar fashion, all the way to the aortic root.

Aorta 110 is now been transected immediately proximal to the first segmental intercoastal branches, which preferably will leave at least 10 cm of the ascending and transverse aortic arch attached to the heart. It is understood that a single branch of the posterior wall of the aorta will be transected at a length of 2 to 3 cm and be ligated with sutures. Anteriorly, the head and neck vessels are identified extending from aorta 110. These are the innominate and carotid arteries. These two larger arteries branch from the anterior surface of aorta 110. Each is preferably transected to a length of from 2 to 4 cm from the anterior surface of aorta 110. A third lesser artery that extends from aorta 110 is also transected at a length from 2 to 4 cm from the interior surface of the aorta. For simplicity in FIG. 4, the arteries extending from aorta 110 are shown as the single aortic artery 412.

At this time, all remaining fibrous and areolar connections to the heart and great vessels are transected. This will leave the heart and great vessels free of the lungs, trachea, and esophagus. The lungs, trachea, and esophagus may now be discarded. Preferably, the heart with its attached vessels will now be washed under running water so any blood or clots are removed. If the pericardial sac is still present, it may be incised longitudinally in the anterior aspect.

Figure 5:
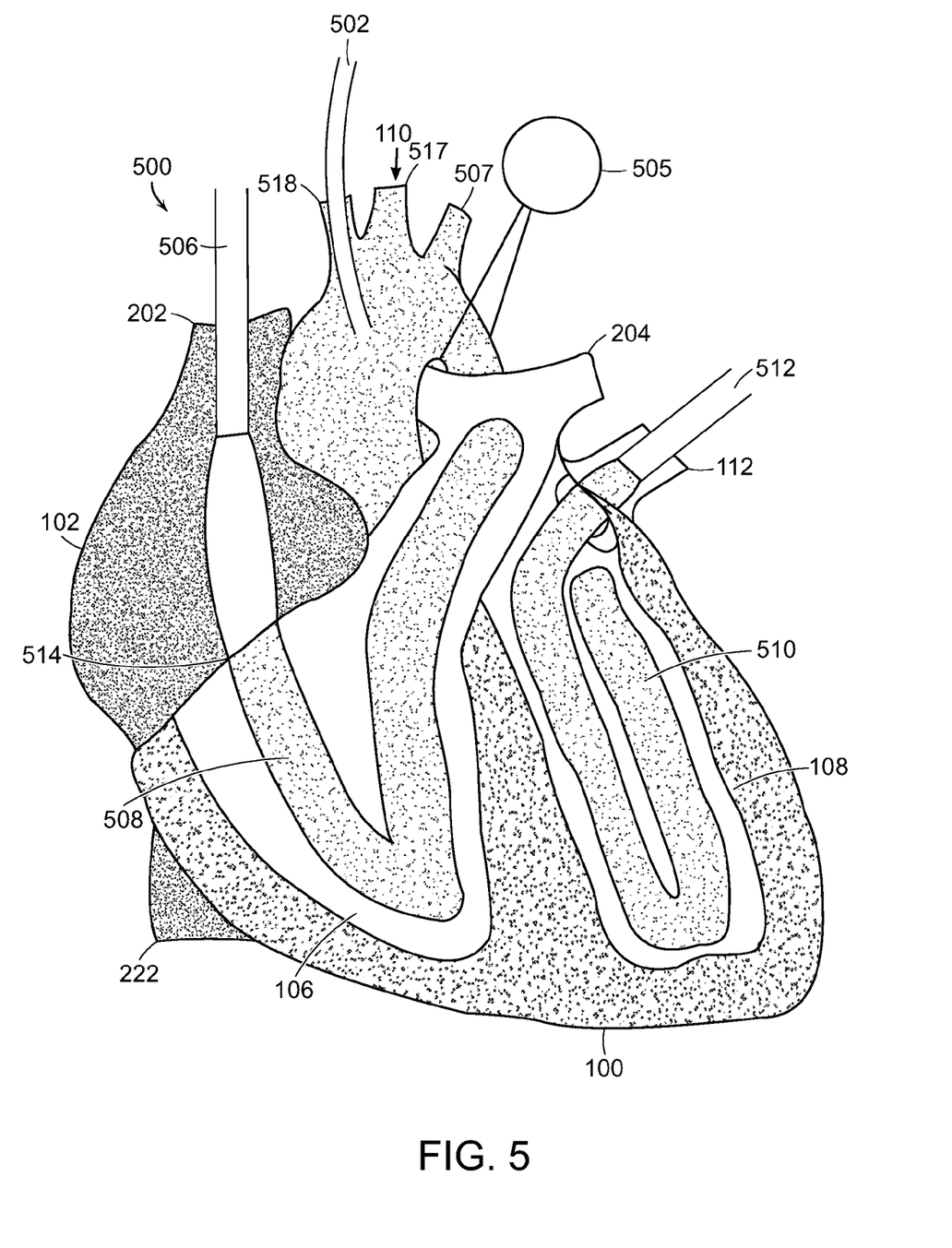
FIG. 5 shows a representative illustration of a porcine heart prepared according to the present invention.

Referring to FIG. 5, generally at 500, and FIGS. 1, 2A, and 2B, preparation of the harvested porcine heart will be described. Using the appropriate suturing material, the open ends of RPVs and LPVs (collectively represented by 112) orifices, and SVC 202 and IVC 222 orifices are purse string sutured. This is followed by the distal ends of the LPA and RPA (204) being ligated.

Intraventricular balloons 508 and 510 are prepared for insertion in the right RV 106 and LV 108, respectively. Preferably, using ¼" tubing connectors with flanges, standard helium grade balloons (60 cc to 250 cc capacity) are attached together using ligatures. Referring to FIG. 5, for example, tube 506 is attached to balloon 508 and tube 512 is attached to balloon 510 in this matter using flanged connectors. As a caution, before inserting the balloons, they are inflated and tested for leaks. If there are leaks, the balloon will be replaced.

Once the balloons have tested good for use, they are inserted in the respective ventricles. Balloon 508 is inserted in RV 106 through SVC 202, right atrium (RA) 102, and tricuspid valve 514. The neck of the balloon, which is secured to a connector flange, is then secured to the SVC 202 orifice by tightening the purse string suturing and tying it to the flange connector with the excess suture material. After securing balloon 508, it is tested for its ability to expand RV 106.

LV 108 is prepared differently than RV 106 because of the thickness of the wall muscle of LV 108. Accordingly, it is necessary to thin out the muscle of LV 108. Preferably, this thinning of the left ventricle wall may be carried out using one of three methods; however, it is understood the other methods may be used and still be within the scope of the present invention.

The first method is to massage the left ventricle by compressing and rolling the muscle with the flat on the hand and fingers against an object, such as a tabletop. Care must be taken not to rupture the full thickness of the LV muscle. The massaging is carried out until there is the feel of the internal structures of the LV giving way, which are, for example, the papillary muscles and course trabeculations.

The second method includes inserting a stiff balloon, for example, the bladder of an infant sphygmomanometer, into LV 108 and inflating it to distend the LV. Care must be taken not to inflate the balloon to the point of rupturing the heart. Preferably, the maximum distention is maintained for at least two minutes.

The third method is to extend a finger through the largest LPV 112 orifice through LA 104 and MV 410. The finger is manipulated to rupture in the posterior papillary muscle, and also punch through the intraventricular septum into RV 106. This third method will univentricularize the heart. When any of the three methods of thinning LV are used, the formerly thick, stiff muscle, preferably, should be pliable and collapsed.

Following thinning LV 108, balloon 510 is prepared in the same manner as balloon 508 that was inserted in RV 106. Balloon 510 is inserted in LV 108 through LPV 112, LA 104, and MV 410. The neck of 510 balloon, which is secured to a flange connector, is then secured to a PV 112 orifice (LPV or RPV) by tightening the purse string suturing and tying it to the flange connector with the excess suture material. Once balloon 510 is positioned in LV 108, it is tested for leaks.

If there are no leaks, the purse string suturing in the three remaining RPV and LPV (112) orifices are used to secure a flange connector in each orifice. These flange connectors have no internal component beyond the flange but each has a soft external component that is attached to a 5 cm length of thin walled tubing that is blocked at the distal end with a silicone plug.

At this point in the preparation process, the LPA and RPA (204) orifices are ligated, inflatable balloon 508 is inserted into RV 106 with its neck secured to the flange connector disposed in the SVC 202 orifice, balloon 510 is inserted in LV 108 with its neck secured to the flange connector disposed in a LPV or RPV (112) orifice, and the remaining three LPV and RPV (112) orifices have flange connectors secured in them with a plugged tube extending therefrom. Now remains the preparation of aorta 110 and IVC 222.

The distal large branch 517 of ascending aorta 110, the common carotid artery, is ligated close to the aorta anterior. The proximal branch 518 of ascending aorta 110, the innominate artery, receives therein a length of tubing 502, preferably, 10 cm in length, with a "bump" on the inserted end. Tubing 502 is secured within with ligature and will form the aortic root perfusion catheter. This ligature may be carried out using suturing or other binding material used in surgical procedures. The distal end of the tube will have a fitting secured to it. A lesser artery at 507 is ligated.

Next, using the suture of the IVC purse string suturing, a flange connector and length of tubing is secured to the IVC 222 orifice. Upon the completion of this step of the method, the porcine heart is harvested and prepared for use in a cardiac simulator system according to the present invention.

The terms and expressions that are used herein are meant for description not limitation. It being recognized that there may be minor changes or modifications that must take place and be within the scope of the present invention.

The invention claimed is:

1. A method for harvesting and preparing mammalian hearts for use in at least cardiac surgical simulator systems, including the steps of:
(A) harvesting a mammalian heart from a host mammalian including the substeps of,
  (1) from a host mammalian tissue block that includes at least a mammalian heart, mammalian lungs and vascular connections between the mammalian heart and mammalian lungs, a predetermined length of the aorta connected to the mammalian heart, a predetermined length of the trachea associated at least with the aorta, and predetermined lengths of a superior vena cava (SVC) and an inferior vena cava (IVC),
  (2) dissecting from the tissue block the SVC and transecting a distal end of the SVC at a predetermined length from the mammalian heart,
  (3) dissecting from the tissue block the IVC and transecting a distal end of the IVC at a predetermined length from the mammalian heart,
  (4) dissecting superior and inferior pulmonary veins (SPV and IPV, respectively) from the tissue block and transecting a distal end of each the SPV and IPV substantially adjacent to an ingress of the SPV and IPV in the mammalian lungs,
  (5) dissecting a right pulmonary artery (RPA) from the tissue block and transecting a distal end of the RPA substantially adjacent to an ingress of the RPA in the mammalian lungs,
  (6) dissecting a left pulmonary artery (LPA) from the tissue block and transecting a distal end of the LPA substantially adjacent to an ingress of the LPA in the mammalian lungs,
  (7) dissecting the aorta from the tissue block and transecting distal ends of at least first, second, and third arteries extending from an anterior surface of the aorta to predetermined lengths from such anterior surface; and
(B) preparing a mammalian heart harvested according to step (A), including the substeps of,
  (1) suturing open distal ends of the SPV, IPV, SVC, and IVC using closable suturing,
  (2) ligating open distal ends of the RPA and LPA,
  (3) inserting a first inflatable member into a right ventricle (RV) of the mammalian heart and securing a first ingress structure of the first inflatable member in the open distal end of the SVC using closable suturing disposed in the SVC at step (B)(1),
  (4) inserting a second inflatable member into a left ventricle (LV) of the mammalian heart and securing a second ingress structure of the second inflatable member in the open distal end of the SPV or IPV using closable suturing disposed in the SPV or IPV at step (B)(1),
  (5) inserting a first connector member in an open distal end of an SPV or IPV that remains after step (B)(4) and securing the first connector member in the open distal end of the remaining SPV or IPV using closable suturing disposed in the remaining SPV or IPV at step (B)(1),
  (6) ligating at least the first and second arteries extending from the aorta and inserting a second connector member in an open distal end of at least the third artery extending from the aorta, and securing the second connector member in the open distal end of the at least the third artery using ligature, and (7) inserting a third connector member in an open distal end of the IVC and securing the third connector in the open distal end of the IVC using closable suturing disposed in the IVC at step (B)(1).

2. The method as recited in claim 1, wherein the mammalian heart includes a porcine heart.

3. The method as recited in claim 2, wherein dissecting the SVC includes clearing areolar and lymphatic tissue from the SVC.

4. The method as recited in claim 2, wherein dissecting the IVC includes clearing areolar and lymphatic tissue, and diaphragm muscle from the IVC.

5. The method as recited in claim 2, wherein the SPV and IPV include left and right SPVs and IPVs.

6. The method as recited in claim 5, wherein dissecting the SPVs and IPVs includes clearing lymphatic tissue from the SPVs and IPVs.

7. The method as recited in claim 2, wherein dissecting the RPA includes clearing lymphatic tissue from the RPA.

8. The method at recited in claim 2, wherein transecting the aorta includes transecting the aorta proximal to first segmental intercoastal branches.

9. The method as recited in claim 8, wherein transecting the aorta proximal to first segmental intercoastal branches will leave a length of ascending and transverse aortic arch attached to the mammalian heart.

10. The method as recited in claim 9, wherein transecting the aorta proximal to first segmental intercoastal branches will leave at least predetermined lengths of the first artery, a carotid artery, and the third artery, an innominate artery, extending from the aorta.

11. The method as recited in claim 10, wherein the method further includes ligating an open distal end of the carotid artery and an open distal end of the second artery.

12. The method as recited in claim 10, wherein the method further includes inserting a tubular member in an open distal end of the innominate artery and securing the tubular member with ligature.

13. The method as recited in claim 2, wherein closable suturing includes purse string suturing.

14. The method as recited in claim 2, wherein the first inflatable member is inserted in the RV through at least the SVC, a right atrium (RA), and a first heart valve.

15. The method as recited in claim 2, wherein the second inflatable member is inserted in the LV through at least the SPV or IPV, a left atrium (LA), and a second heart valve.

16. The method as recited in claim 2, wherein the distal end of the first connector member secured in the remaining SPV or IPV includes a closure member disposed therein.

17. A method for preparing mammalian hearts for use in at least cardiac surgical simulator systems, including the steps of:

(A) suturing open distal ends of the superior pulmonary vein (SPV), inferior pulmonary vein (IPV), superior vena cava (SVC), and inferior vena cava (IVC) of a harvested mammalian heart using closable suturing, (B) ligating open distal ends of the right pulmonary artery (RPA) and left pulmonary artery (LPA) of the harvested mammalian heart, (C) inserting a first inflatable member into a right ventricle (RV) of the mammalian heart and securing a first ingress structure of the first inflatable member in the open distal end of the SVC using closable suturing disposed in the SVC at step (A), (D) inserting a second inflatable member into a left ventricle (LV) of the mammalian heart and securing a second ingress structure of the second inflatable member in the open distal end of the SPV or IPV using closable suturing disposed in the SPV or IPV at step (A), (E) inserting a first connector member in an open distal end of SPV or IPV that remains after step (D) and securing the first connector member in the open distal end of the remaining SPV or IPV using closable suturing disposed in the remaining SPV or IPV at step (A), (F) ligating at least first and second arteries extending from the aorta and inserting a second connector member in an open distal end of at least a third artery extending from the aorta, and securing the second connector member in the open distal end of the at least the third artery using ligature, and (G) inserting a third connector member in an open distal end of the IVC and securing the third connector in the open distal end of the IVC using closable suturing disposed in the IVC at step (A).

18. The method as recited in claim 17, wherein the mammalian heart includes a porcine heart.

19. The method as recited in claim 18, wherein the SPV and IPV include left and right SPVs and IPVs.

20. The method as recited in claim 18, wherein the arteries extending from the aorta include the first artery, a carotid artery, the second artery, and the third artery, an innominate artery.

21. The method as recited in claim 20, wherein the method further includes ligating an open distal end of the carotid artery and an open distal end of the second artery.

22. The method as recited in claim 20, wherein the method further includes inserting a tubular member in an open distal end of the innominate artery and securing the tubular member with ligature.

23. The method as recited in claim 18, wherein closable suturing includes purse string suturing.

24. The method as recited in claim 18, wherein the first inflatable member is inserted in the RV through at least the SVC, a right atrium (RA), and a first heart valve.

25. The method as recited in claim 18, wherein the second inflatable member is inserted in the LV through at least the SPV or IPV, a left atrium (LA), and a second heart valve.

26. The method as recited in claim 18, wherein the distal end of the first connector member secured in the remaining SPV or IPV includes a closure member disposed therein.

* * * * *